United States Patent
Kapinos et al.

(10) Patent No.: US 10,817,436 B2
(45) Date of Patent: Oct. 27, 2020

(54) REMOVAL WARNING FOR CONNECTABLE DEVICES

(71) Applicant: Lenovo (Singapore) Pte. Ltd., Singapore (SG)

(72) Inventors: Robert James Kapinos, Durham, NC (US); Russell Speight VanBlon, Raleigh, NC (US); Timothy Winthrop Kingsbury, Cary, NC (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 249 days.

(21) Appl. No.: 15/217,160

(22) Filed: Jul. 22, 2016

(65) Prior Publication Data

US 2018/0024946 A1  Jan. 25, 2018

(51) Int. Cl.
*G06F 3/06* (2006.01)
*G06F 13/10* (2006.01)

(52) U.S. Cl.
CPC .......... *G06F 13/102* (2013.01); *G06F 3/0604* (2013.01); *G06F 3/0653* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 2005/0182867 A1* | 8/2005 | Reynolds | G06F 11/325 710/33 |
| 2009/0228823 A1* | 9/2009 | Edwards | G06F 3/0605 715/772 |

* cited by examiner

*Primary Examiner* — Scott C Sun
(74) *Attorney, Agent, or Firm* — Ference & Associates LLC

(57) ABSTRACT

One embodiment provides a method, including: detecting, using a processor of a host device, that the host device is busy with respect to an impending data transfer to a connectable storage device operatively coupled to the host device; and communicating, to the connectable storage device, data that triggers an indicator of the connectable storage device. Other aspects are described and claimed.

20 Claims, 6 Drawing Sheets

REMOVAL WARNING FOR CONNECTABLE DEVICES

BACKGROUND

Connectable devices such as pluggable data storage devices or memory sticks are connected to other devices for use. For example, a plugged data storage device such as a USB memory stick may be inserted or plugged into a USB port of another device such as a laptop computer, desktop computer, etc.

If the connectable device is removed unexpectedly, e.g., prior to finishing a save operation of data communicated by another device, there may be unintended consequences such as data loss from the connectable device's memory. Many connectable devices therefore implement some indication, e.g., a busy light, which attempts to indicate to or notify the user that the device is busy and should not be physically removed from the data port or disconnected from the other device. Such busy lights are only representative of the internal state of the connectable device.

BRIEF SUMMARY

In summary, one aspect provides a method, comprising: detecting, using a processor of a host device, that the host device is busy with respect to an impending data transfer to a connectable storage device operatively coupled to the host device; and communicating, to the connectable storage device, data that triggers an indicator of the connectable storage device.

Another aspect provides a host device, comprising: a display device; a communication port; a processor operatively coupled to the display device and the communication port; and a memory operatively coupled to the processor, wherein the process executes code in the memory to: detect that the host device is busy with respect to an impending data transfer to a connectable storage device operatively coupled to the communication port; and communicate, to the connectable storage device, data that triggers an indicator of the connectable storage device.

A further aspect provides a program product, comprising: a storage device that includes code that is executable by a processor, the code comprising: code that detects, using a processor of a host device, that the host device is busy with respect to an impending data transfer to a connectable storage device operatively coupled to the host device; and code that communicates, to the connectable storage device, data that triggers an indicator of the connectable storage device.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
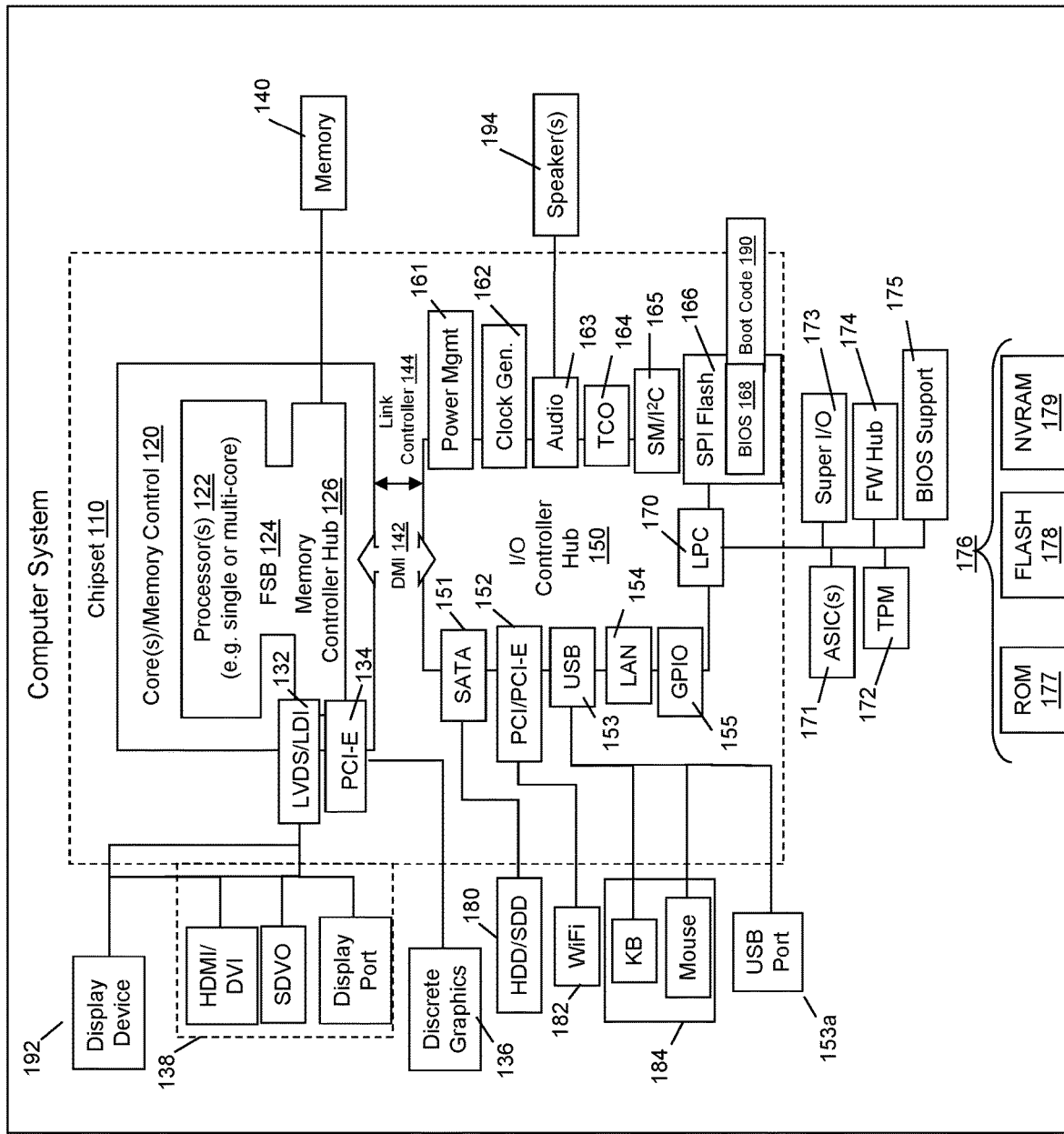
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While conventional connectable data storage devices include a light or lights that indicate that the device is busy, e.g., plugged into a port of host device and currently saving data, the light(s) do not go far enough, particularly because the connectable storage device may be busy caching writes or the host may have delayed data operations in queue for the connectable storage device. In such cases, the lights will not properly apprise a user that the connectable storage device should not be unplugged.

Existing host solutions, implemented in software, only put on-screen notifications up when the connectable device is software ejected from the host or is unexpectedly removed from the host physically. While hosts try to maintain or track a connectable device eject state, connectable devices have become more complex, i.e., perform additional functions that the host is unaware of, such as stage caching, data relocation, and internal error collection. Therefore, at times the host will be unaware that the connectable storage device is busy.

Accordingly, an embodiment provides a connectable storage device (also referred to as a pluggable storage device) with indicators, uses a standardized interface to communicate with the connectable storage device, and a software driver that detects a state for indicating whether or not the connectable storage device is safe to remove.

In an embodiment, the connectable storage has one or more indicators, e.g., light emitting diodes (LEDs), on it that indicate unsafe activity, i.e., warn if the connectable storage device should not be unplugged from another (host) device. These indicators might include a red light that comes on when it is unsafe to unplug the connectable storage device and/or a green light that comes on when it is safe to remove the connectable storage device.

An embodiment provides a standardized interface as an extension to a storage command set. This extension permits a host device (e.g., via a device driver) to communicate to the connectable storage device that unplugging is not safe or is safe. Extensions of the existing advanced technology attachment (ATA) and Small Computer System Interface (SCSI) device control command sets may be used to implement this feature. Some proprietary light control interfaces also might be used.

An embodiment provides a software driver to use existing write detection methods to determine that file handle(s) to the connectable storage device are open for writing. If so, an embodiment sends a notification through the standardized interface indicating to the connectable storage device that it should not be removed, i.e., indicate as busy. When all writing operations are closed, the driver sends message(s) to tell the connectable storage device that ejection is safe, i.e., indicate that removal is safe or permitted. The connectable storage device therefore is programmed to respond to the software driver data communications by manipulating the indicator state (e.g., light) to inform the user it is safe to remove the connectable storage device.

In an embodiment, the connectable storage device is programmed to determine its internal state and communicate the same to the host device. This may be accomplished proactively or may be done in response to a polling message of the host, or a combination of the foregoing. The connectable storage device communicates a busy state to apprise the host device that it should not be cleared to eject. This permits the host to provide an indication, e.g., on a display screen, that it is not safe to remove the connectable storage device.

The illustrated example embodiments will be best understood by reference to the figures. The following description is intended only by way of example, and simply illustrates certain example embodiments.

While various other circuits, circuitry or components may be utilized in information handling devices, FIG. 1 depicts a block diagram of an example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 110 includes a core and memory control group 120 and an I/O controller hub 150 that exchanges information (for example, data, signals, commands, etc.) via a direct management interface (DMI) 242 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture. One or more processors 122 comprise internal arithmetic units, registers, cache memory, busses, I/O ports, etc., as is well known in the art.

In FIG. 1, the memory controller hub 126 interfaces with memory 140 (for example, to provide support for a type of RAM that may be referred to as "system memory" or "memory"). The memory controller hub 126 further includes a low voltage differential signaling (LVDS) interface 132 for a display device 192 (for example, a CRT, a flat panel, touch screen, etc.). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs, etc., 180), a PCI-E interface 152 (for example, for wireless connections 182), a USB interface 153 (for example, for devices 184 such as a digitizer, keyboard, mice, cameras, phones, microphones, storage, biometric data capture device, other connected devices, etc.), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support. USB interface 153 may include a physical port 153a, e.g., into which a connectable or pluggable storage device is placed.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling device circuitry, as for example outlined in FIG. 1, may be used in devices such as personal computer devices generally, e.g., a laptop or desktop computer. These devices may include port(s) or other interfaces to which a connectable or pluggable device is operatively connected, i.e., act as a host device and operate a device driver for detecting device states of a connectable storage device and communicate there-with, as further described herein.

Figure 2:
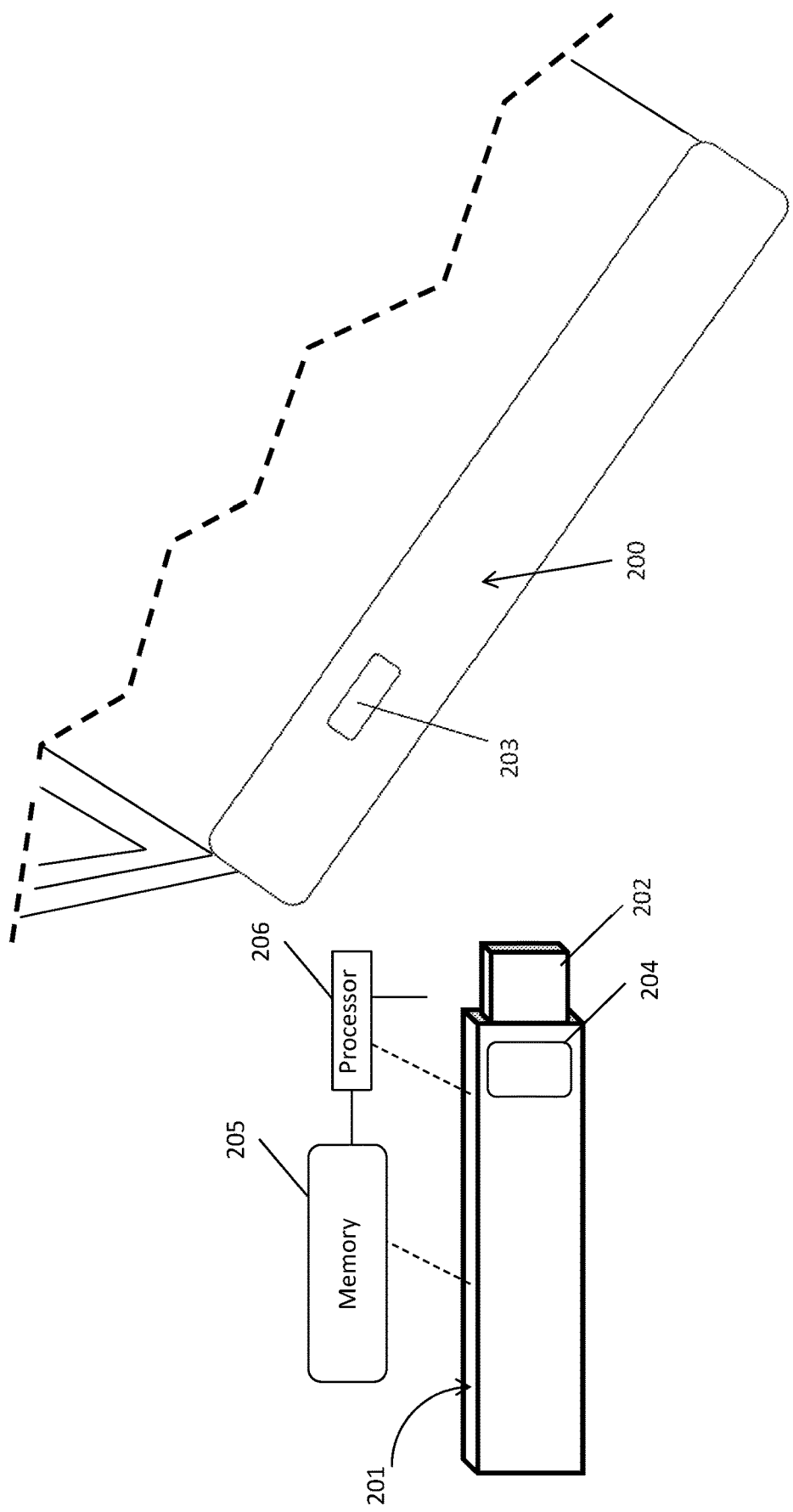
FIG. 2 illustrates an example connectable device and host device.

Referring now to FIG. 2, a connectable storage device 201 is illustrated in an unconnected or unplugged state with a host device 200, e.g., a laptop computer (only part of which is shown). When a connection element 202 of the connectable storage device 201 is plugged into a port 203 (e.g., USB port) of the host device 201, this permits the host device 200 and the connectable storage device 201 to communicate data (e.g., file data and control commands). The connectable storage device 201 includes a memory 205 and a processor (or circuit) 206 for data communication and storage. The connectable storage device 201 includes one or more indicators 204, e.g., that operate to indicate if the connectable storage device 201 is busy or is safe to remove, e.g., indicate if all write operations have been completed.

Figure 3:
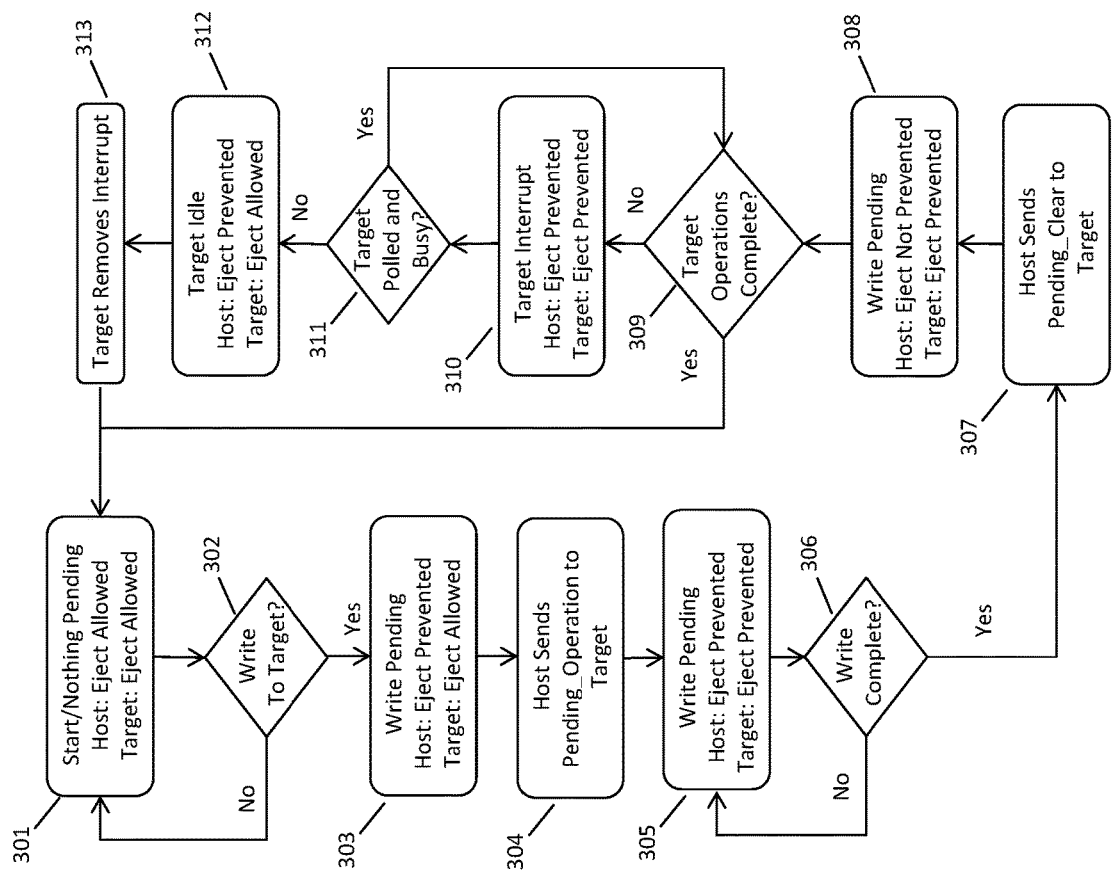
FIG. 3 illustrates an overview of device states and communications between a host and a connectable device.

As illustrated in FIG. 3, at 301 the host device and the connectable storage device (herein also referred to as a target or target device) are not communicating, i.e., the host is not writing to the target device. If a write is pending to the target device, as detected at 302, the host device updates its state and indicator to busy or eject prevented because future writing operations will be performed, whereas the target device state and indicator remains not busy or eject allowed, as illustrated at 303.

However, the host device will send data, e.g., Pending_Operation signal, to the target to inform the target that write operations are pending, as illustrated at 304. The write pending state is now active at both the host device and the target, and as illustrated at 305 the host device state remains eject prevented and the target state is updated to eject prevented as well.

If the write operation is complete as to the host device, as determined at 306, the host device sends data at 307, e.g., Pending_Clear signal, to the target to inform the target of the host device state. Therefore, the host device state is eject not prevented, whereas the target device state remains eject prevented, as illustrated at 308. If the target internally determines that it has completed all operations, as illustrated at 309, the target may update its state to eject allowed. However, if the target determines that operations are still pending internally, the target issues an interrupt to the host device as illustrated at 310. The host device state is then updated to eject prevented and the target state remains eject prevented.

The target may determine that internal operations have been completed, for example in response to a poll message received from the host device, as illustrated at 311. If the operations have been completed, the target is idle and the device state of the target is changed to eject allowed, as illustrated at 312. As further illustrated at 312, the host device state remains as eject prevented, and so the target removes the interrupt at 314, permitting the host device state to be updated to eject allowed.

Figure 4:
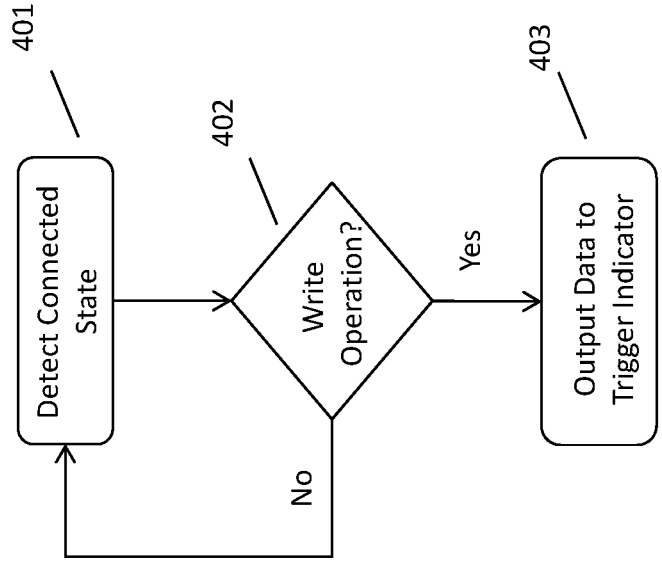
FIG. 4 illustrates an example method of communicating removal warning data to a connectable device.

Referring to FIG. 4, in a state where the connectable storage device is physically plugged into a host device port, as detected at 401, an embodiment uses a software driver to perform pending write detection, as indicated at 402, using the knowledge that data has been prepared for writing to the connectable storage device but has not yet been communicated to the communication port of the host device. If so, an embodiment sends a notification at 403, e.g., through a standardized interface, indicating to the connectable storage device that it should not be removed, i.e., indicate as busy. This provides data to the connectable storage device sufficient to operate an indicator, e.g., light a red LED apprising the user that the connectable storage device is busy.

In contrast, when all writing operations are closed, e.g., as determined at 402 by the device driver, the device driver of the host device sends data to tell the connectable storage device that ejection is safe, i.e., indicate that removal is safe or permitted. As described herein, one or more LEDs (or other indicators) may be used to communicate busy and safe states to the user.

Figure 5:
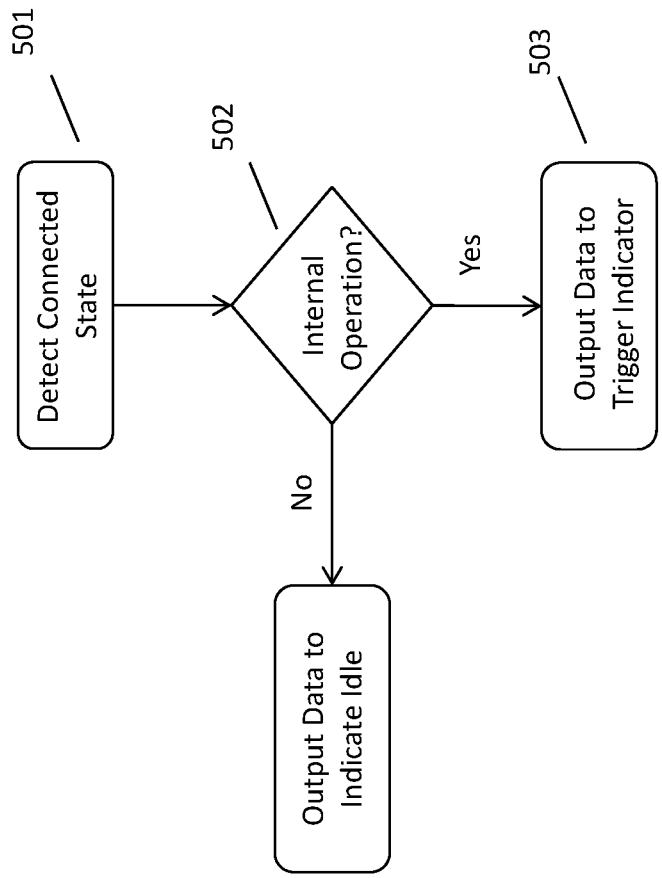
FIG. 5 illustrates an example method of communicating removal warning to a host device.

Referring to FIG. 5, in a state where the connectable storage device is physically plugged into a host device port, as detected at 501, an embodiment determines if the connectable storage device has internal operations pending, as indicated at 502. If so, an embodiment sends a notification at 503, e.g., through a standardized interface, indicating to the host that the connectable storage device should not be removed, i.e., the host device may display an indicator that the connectable storage device is busy. This provides data to the host device to operate an indicator, e.g., a display graphic apprising the user that the connectable storage device is busy.

In contrast, when all internal operations are finished, e.g., as determined at 502, the connectable storage device sends data to update the host device state to indicate the connectable storage device is idle, e.g., to tell the host device that ejection is safe, i.e., indicate that removal is safe or permitted. As described herein, a displayed graphic may be used to communicate busy and safe states to the user.

The connectable storage device, as indicated in FIG. 2, is therefore programmed to respond to the software driver data communications by manipulating the indicator(s) (e.g., light(s)) to inform the user it is or is not safe to remove the connectable storage device. This provides the user with a more accurate indication of the connectable storage device's state in terms of removal capability. Likewise, the connectable storage device includes logic to communicate if its internal operations are complete, permitting the host device to be aware of the connectable storage device state, and indicate the same more accurately to the user.

It should be noted that the indicator, either of the connectable storage device (e.g., LED) or of the host device (e.g., a display graphic) may be used in a persistent fashion or may be displayed at particular times, e.g., after detecting that the user is attempting to remove the connectable storage device from the host. A combination of the foregoing is possible. For example, the LEDs of the connectable storage device may track busy state data and persistently indicate the same. In contrast, the host may display a display graphic only at particular times, e.g., in response to detecting (e.g., using a contact or proximity sensor) that the user is contacting the connectable storage device while the connectable storage device is in a busy state.

Figure 6:
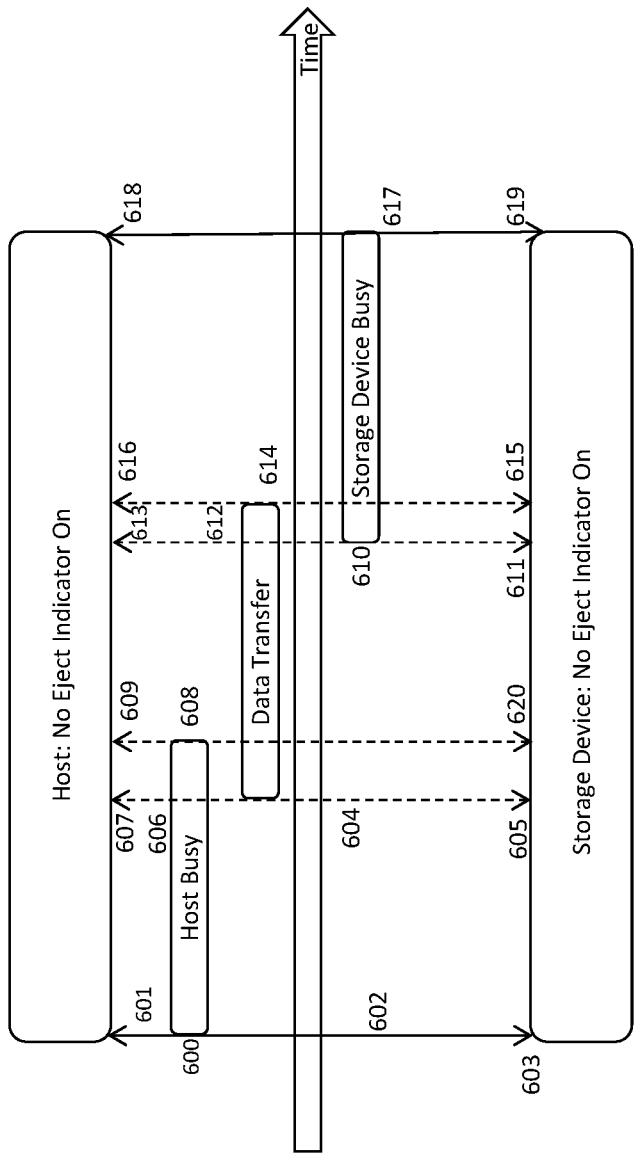
FIG. 6 illustrates an example diagram of device state and device interactions over time.

Referring to FIG. 6, the sequences that a device pair might go through in displaying removal warnings are illustrated. Initially no activity is pending and the connectable storage device can be removed. At 600 the host device initiates an operation that only affects itself e.g., preparing some data for writing, and shows the eject restrict notification, e.g., on its display, at 601. Simultaneously at 602 the host device informs the connectable storage device that it should not be ejected. The connectable storage device shows its own indicator and saves the state of host device busy at 603.

At 604 a data transfer between devices begins. The connectable storage device detects the data transfer and tries to turn its no-eject indicator on. Since the indicator is already on, it stays on at 605. Simultaneously, the host device detects the data transfer at 606. The host device tries to turn its no-eject display on at 607, and since it is already on, nothing happens. At 608 the host device ends its activity. The host device checks at 609 whether it can turn off the no-eject display. Since a data transfer is in progress, the no-eject display remains on. Simultaneous with 608, the host device informs the connectable storage device that it is not busy. At 620, the connectable storage device clears the state of the host device, but does not turn the no-eject indicator off because a data transfer is in progress.

At 610 the connectable storage device goes into a state where eject is not possible, e.g. from media writes falling behind cached data accumulation. The connectable storage device tries to display a no-eject warning at 611. Since the indicator is already on, nothing happens. The connectable storage device simultaneously with 610 informs the host device that it is busy at 612, where the host device stores the state that the connectable storage device is busy. The host device responds by trying to show its own no-eject indicator at 613. Since it is already on, nothing happens.

At 614 the data transfer ends. The connectable storage device responds to data transfer ending by checking at 615 whether it can turn off the no-eject indicator. The indicator does not turn off because the connectable storage device is still internally busy. The host device checks at 616 whether it can turn off its no-eject indicator, but does not because of the connectable storage device state saved from 612. The connectable storage device completes its operations at 617. Since there are no saved no-eject states from the host device, and no data transfer in progress, it turns its no-eject indicator off. Simultaneously with 617, the connectable storage device informs the host device that it is not busy. At 618 the host device clears the no-eject state it had saved from 613, and since there is no data transfer in progress or internal no-eject states, turns its no-eject indicator off.

By providing this improved interaction, an embodiment reduces the possibility that a user will inadvertently remove a connectable storage device while writes or other data operations are pending for either device. Further, the device driver may be configured to communication using a standardized interface or protocol, such that the device driver is compatible with most or all connectable storage devices.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, using a processor of a host device, that the host device is busy with respect to an impending data transfer to a connectable storage device operatively coupled to the host device, wherein the impending data transfer comprises at least one file wherein the detecting is based on determining at least one file handle to the connectable storage device is open for writing;
    communicating a busy state, to the connectable storage device through a communication port of the host device, wherein the busy state provides a trigger to an indicator of the connectable storage device, wherein the communicating the busy state occurs before the impending data transfer of the at least one file;
    responsive to the busy state, updating the indicator of the connectable storage device to an unsafe indicator indicating the connectable storage device should not be unplugged from the host device;
    transferring the at least one file to the connectable storage device through the communication port of the host device; and
    responsive to identifying the host device is no longer busy with respect to the connectable storage device, updating the indicator of the connectable storage device to a safe indicator indicating the connectable storage device can be unplugged from the host device.

2. The method of claim 1, wherein the detecting includes detecting that data has been prepared by the host device for writing to the connectable storage device but has not yet been communicated to the connectable storage device.

3. The method of claim 1, wherein the communicating occurs using a standardized interface.

4. The method of claim 1, wherein the communicating is initiated by a device driver of the host device.

5. The method of claim 1, wherein the connectable storage device is physically connected to the host device.

6. The method of claim 1, further comprising:
receiving, at the host device, data from the connectable storage device that indicates that the connectable storage device is internally busy; and
indicating that the connectable storage device is busy.

7. The method of claim 6, wherein the indicating that the connectable storage device is busy comprises displaying a graphic on a display screen of the host device.

8. The method of claim 6, further comprising detecting that a user is attempting to disconnect the connectable storage device;
wherein the indicating that the connectable storage device is busy occurs after detecting that a user is attempting to disconnect the connectable storage device.

9. The method of claim 1, further comprising detecting that a user is attempting to disconnect the connectable storage device;
wherein the communicating, to the connectable storage device, data that triggers the indicator of the connectable storage device occurs after detecting that a user is attempting to disconnect the connectable storage device.

10. A host device, comprising:
a display device;
a communication port;
a processor operatively coupled to the display device and the communication port; and
a memory operatively coupled to the processor, wherein the processor executes code in the memory to:
detect that the host device is busy with respect to an impending data transfer to a connectable storage device operatively coupled to the communication port, wherein the impending data transfer comprises at least one file, wherein the detecting is based on determining at least one file handle to the connectable storage device is open for writing;
communicate a busy state, to the connectable storage device through a communication port of the host device, wherein the busy state provides a trigger to an indicator of the connectable storage device, wherein the communicating the busy state occurs before the impending data transfer of the at least one file;
responsive to the busy state, update the indicator of the connectable storage device to an unsafe indicator indicating the connectable storage device should not be unplugged from the host device;
transferring the at least one file to the connectable storage device through the communication port of the host device; and
responsive to identifying the host device is no longer busy with respect to the connectable storage device, update the indicator of the connectable storage device to a safe indicator indicating the connectable storage device can be unplugged from the host device.

11. The host device of claim 10, wherein the processor executes code in the memory to detect that the host device is busy by detecting that data has been prepared by the host device for writing to the connectable storage device.

12. The host device of claim 10, wherein the processor executes code stored in the memory to communicate with the connectable storage device using a standardized interface.

13. The host device of claim 10, wherein the processor executes code stored in the memory to communicate the data using a device driver of the host device.

14. The host device of claim 10, wherein the connectable storage device is physically connected to the host device.

15. The host device of claim 10, wherein the processor further executes code in the memory to:
receive, at the host device, data from the connectable storage device that indicates that the connectable storage device is internally busy; and
indicate that the connectable storage device is busy.

16. The host device of claim 15, wherein the host device displays a graphic on the display screen to indicate that the connectable storage device is busy.

17. The host device of claim 16, wherein the processor executes code in the memory to:
detect that a user is attempting to disconnect the connectable storage device;
wherein the processor of the host device indicates that the connectable storage device is busy after detecting that a user is attempting to disconnect the connectable storage device.

18. The host device of claim 10, wherein the processor executes code in the memory to detect that a user is attempting to disconnect the connectable storage device; and
wherein the processor executes code in the memory to communicate, to the connectable storage device, data that triggers the indicator of the connectable storage device after detecting that a user is attempting to disconnect the connectable storage device.

19. The host device of claim 10, wherein the host device is selected from the group consisting of a desktop computing device and a laptop computing device.

20. A program product, comprising:
a storage device that includes code that is executable by a processor, the code comprising:
code that detects, using a processor of a host device, that the host device is busy with respect to an impending data transfer to a connectable storage device operatively coupled to the host device, wherein the impending data transfer comprises at least one file, wherein the detecting is based on determining at least one file handle to the connectable storage device is open for writing;
code that communicates a busy state, to the connectable storage device through a communication port of the host device, wherein the busy state provides a trigger to an indicator of the connectable storage device, wherein the communicating the busy state occurs before the impending data transfer of the at least one file;
responsive to the busy state, code that updates the indicator of the connectable storage device to an unsafe indicator indicating the connectable storage device should not be unplugged from the host device;
transferring the at least one file to the connectable storage device through the communication port of the host device; and
responsive to identifying the host device is no longer busy with respect to the connectable storage device, code that updates the indicator of the connectable storage device to a safe indicator indicating the connectable storage device can be unplugged from the host device.

\* \* \* \* \*